United States Patent
Brooke

[15] 3,669,208
[45] June 13, 1972

[54] VEHICLE GUIDANCE SYSTEMS

[72] Inventor: David William Ingham Brooke, Brightwell, England

[73] Assignee: International Harvester Company of Great Britain Limited, London, England

[22] Filed: Oct. 13, 1969

[21] Appl. No.: 865,931

[30] Foreign Application Priority Data

Oct. 16, 1968 Great Britain.......................49,140/68
Dec. 4, 1968 Great Britain.......................57,498/68

[52] U.S. Cl..............................180/98, 180/79.1, 318/587, 318/608
[51] Int. Cl........................................B60k 27/06
[58] Field of Search..................180/98, 79.1, 79; 318/580, 318/587, 608; 172/2, 3

[56] References Cited

UNITED STATES PATENTS

| | | | |
|---|---|---|---|
| 3,468,391 | 9/1969 | Rushing et al. | 180/98 |
| 3,128,840 | 4/1964 | Barrett, Jr. | 318/587 X |
| 3,009,525 | 11/1961 | Deliban | 340/4 X |
| 3,407,895 | 10/1968 | Hasenbalg | 180/98 X |
| 3,018,368 | 1/1962 | Mountjoy | 246/182 |
| 3,482,644 | 12/1969 | Krieger et al. | 180/98 |
| 3,431,996 | 3/1969 | Giles et al. | 318/587 X |

Primary Examiner—Benjamin Hersh
Assistant Examiner—John P. Silverstrim
Attorney—Floyd B. Harman

[57] ABSTRACT

A vehicle guidance system in which a vehicle may be guided to follow accurately any one of a number of paths laterally offset different predetermined distances from a single guide wire using a magnetic sensing head arrangement which does not have to operate from a null position above the guide wire. Preferably the vehicle is guided along a path determined by a selected value of the ratio between the effective gradient and the vertical component of the electromagnetic field and the strength of the vertical component of the electromagnetic field at the vehicle, the selection of the desired path offset a predetermined distance from the guide member being made by the use of a variable electrical device such as a potentiometer.

6 Claims, 10 Drawing Figures

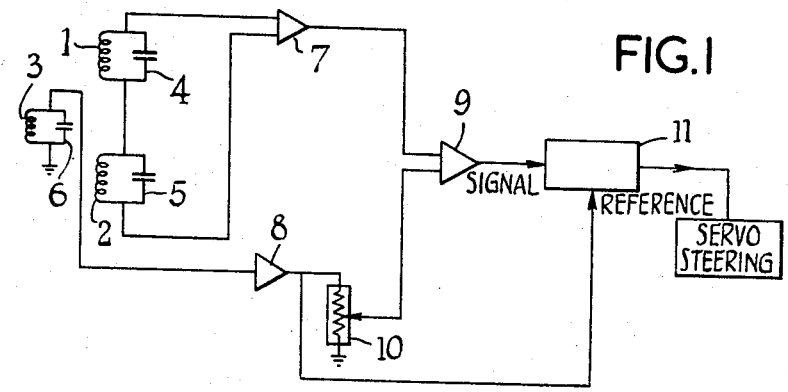
FIG.1
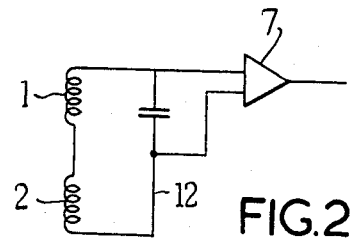
FIG.2
FIG.3
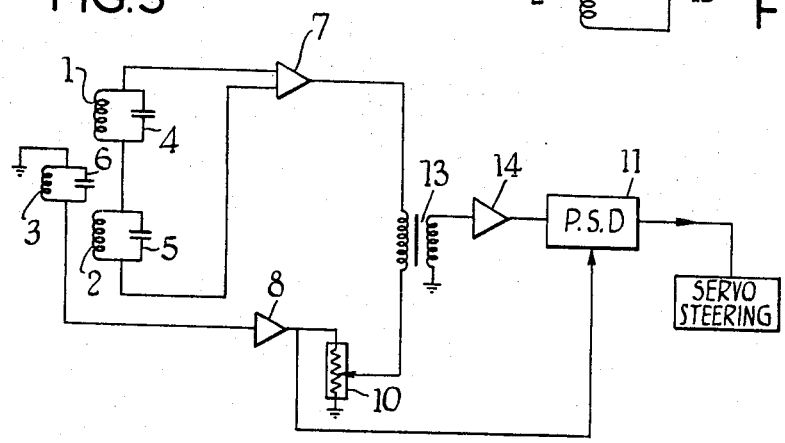
FIG.4
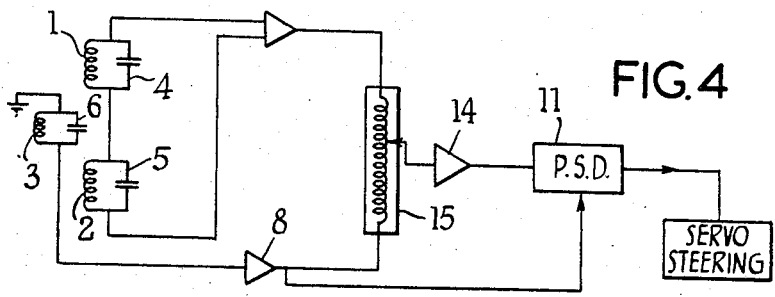
INVENTOR
DAVID W.I. BROOKE

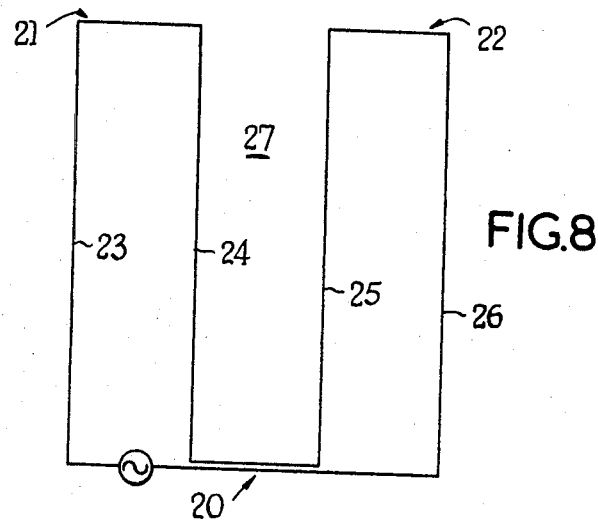
FIG.8
FIG.9
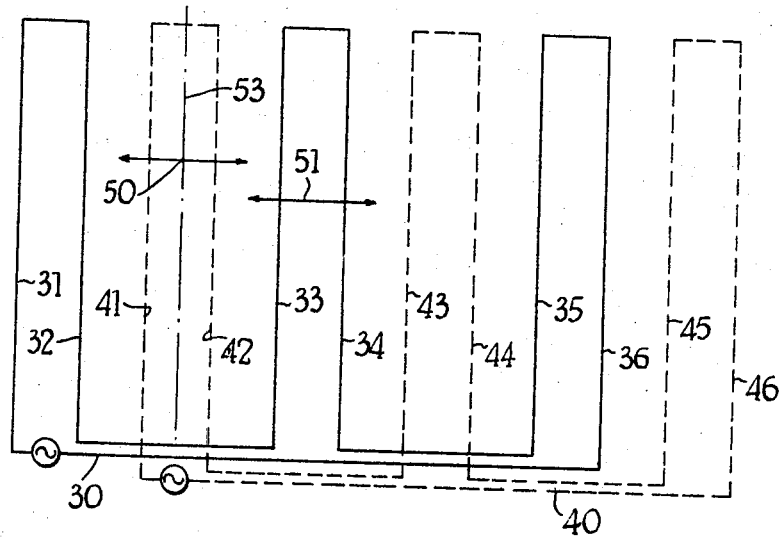
FIG.10
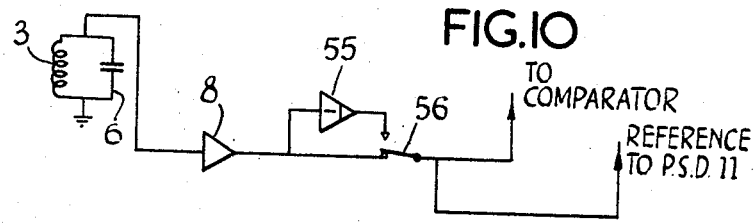
INVENTOR
DAVID W.I. BROOKE

VEHICLE GUIDANCE SYSTEMS

This invention relates to vehicle guidance systems, and particularly to a vehicle adapted for guidance along a plurality of paths under the control of a guide member which emits an electromagnetic guide signal.

Systems in which vehicles are guided under the control of an electromagnetic guide signal emitted from a guide member have previously been proposed. Such systems normally operate with the sensing head or sensor which is carried by the vehicle vertically above the guide wire. However, in automated field work, particularly for agricultural purposes, a vehicle is required to operate so as to work the whole of a particular field area. Consequently, if the vehicle is to pass vertically over the guide wire throughout the whole of its operation in one field, the quantity of wire which has to be provided becomes impracticably large. Also difficulties inevitably arise because the widths of the different implements drawn by the vehicle in the field vary, and different work patterns may have to be followed.

From the economic point of view, the amount of wire which is employed is very significant. A reduction in the amount of wire which is required may be achieved by making a vehicle follow a number of different paths using the same guide wire. If the sensing head on the vehicle is to be maintained over the wire, then it must be arranged to move laterally relative to the vehicle so that the vehicle is caused to follow a path parallel to the wire and offset from it. Mechanical considerations limit the amount which the sensing head can be moved relative to the vehicle to about 10 feet so that, even when using this system, guide wires have to be laid at least every 20 feet.

It is a main object of the present invention to provide a vehicle operable in a vehicle guidance system in which the guide wires are substantially more widely spaced than in the system mentioned above.

In accordance with the present invention there is provided a vehicle guidance system wherein an electromagnetic field is generated by a guide member, two determinations are made at the vehicle, each determination being of the electromagnetic field at the vehicle or of a function or component of the electromagnetic field at the vehicle and the two determinations providing a ratio which gives a unique identification of the position of the vehicle in relation to the guide member, signals based on the two determinations are compared in such a manner as to indicate whether or not the ratio between the two determinations has departed from a selected ratio which identifies a desired path laterally offset a first predetermined distance from the guide member, and an output signal resulting from the comparison is utilized in steering the vehicle substantially to follow the said desired path, and wherein a comparison of signals based on the two determinations is subsequently effected in such manner as to indicate whether or not the ratio between the two determinations has departed from another selected ratio which identifies a desired path laterally offset a second predetermined distance from the guide member, and an output signal resulting from the last mentioned comparison is utilized in steering the vehicle substantially to follow the desired path, whereby the vehicle may be caused to follow a plurality of paths laterally offset different distances from the same guide member.

By using a ratio of two determinations, both of which are related to the electromagnetic field at the vehicle, the unique identification of the position of the vehicle in relation to the guide member is independent of variations in the actual electromagnetic field strength at the vehicle which may be due to changes in the current in the guide member.

Advantageously the comparison is effected using the null method so that any output signal from the comparison indicates the deviation of the vehicle from the desired path. Therefore at least one of the signals based on the two determinations is a proportion only of the determination, the proportion being so chosen that the signals which are compared are equal when the two determinations are in the selected ratio and no output signal from the comparison is obtained when the vehicle is following the desired path.

In accordance with the present invention it is contemplated that the ratio of the two determinations which are used to give a unique indication of the position of the vehicle are a ratio of any two components or functions of the electromagnetic field which give a determination which is sufficiently accurate within the limits required by the application in which the vehicle guidance system is being employed. The two determinations may be determinations of the electromagnetic field at two spaced points on the vehicle. Because the electromagnetic field at the vehicle is at an angle close to the vertical for all positions of the vehicle except positions within 20 feet of a guide wire which is in a horizontal plane substantially displaced from the horizontal plane which passes through the sensing head on the vehicle, the two determinations could suitably be of the vertical components of the electromagnetic field at laterally spaced points on the vehicle. In this case the ratio which is taken is $R = H_1/H_2$, or in the preferred case $H_1 = a \cdot H_2$ where $a$ is a constant less than 1.

It has been found, however, that the determination of the position of the vehicle based on a ratio of the vertical components of the electromagnetic field at spaced points on the vehicle requires a greater accuracy in the measurement of $H_1$ and $H_2$ than does the measurement of a related variable $K = 1 - R$.

Then $$K = 1 - R = 1 - H_1/H_2 = (H_2 - H_1)/H_2$$
or $K = H\text{diff}/H$ where Hdiff is the difference in field strength at opposite sides of the vehicle and $H$ is the field strength measured at some convenient point, for example one of the laterally spaced points or at the vehicle center line.

Because of the greater accuracy obtainable in the control of the guided vehicle by a measurement of $K$ rather than a measurement of $R$, the preferred method in accordance with the present invention involves the determination of the difference in the field strength at two laterally spaced points on the vehicle and a comparison of this difference with the field, or a proportion of the field, at the vehicle.

When the measurement of the difference in field strength is always made at the same two points on the vehicle, so that the distance between the two points is a constant, any measurement of Hdiff is an effective determination of the gradient of the electromagnetic field at the vehicle.

According to a preferred embodiment of the present invention there is provided a vehicle guidance system in which a vehicle is caused to follow a predetermined path laterally offset relative to a guide member which generates an electromagnetic field by determining the difference between the vertical components of the electromagnetic field at points laterally spaced on the vehicle, comparing the difference between the said vertical components with a signal based on a determination of the electromagnetic field at the vehicle, and utilizing any output from the comparison to control the steering of the vehicle substantially along the predetermined path, and wherein the vehicle is caused to follow a second predetermined path laterally offset a different distance from the guide member by comparing the said difference with a different signal based on a determination of the strength of the electromagnetic field at the vehicle, and similarly utilizing any output from the comparison to control the steering of the vehicle substantially along the second predetermined path.

As already stated it is most advantageous if the comparison which is effected is arranged such that there is no output from it when the vehicle is on the desired laterally offset path. In order to effect this, the signal which is based on the determination of the strength of the electromagnetic field at the vehicle should either measure a component of the electromagnetic field which has a smaller strength than the vertical components at the laterally spaced points on the vehicle, or it should employ a detector having a smaller response to the electromagnetic field than the detectors at the laterally spaced points. Alternatively, if the detector is similar in response and determines the vertical component of the electromagnetic field at the vehicle, an attenuator or similar device should be employed to reduce the strength of the signal $H$ before the comparison with $H$diff is effected.

In the case where the detector of $H$ has a smaller response than the detectors of $H_1$ and $H_2$, an attenuator or similar device may be used to regulate $H$diff before the comparison with $H$. The attenuators in either case will be variable in order to facilitate the selection of two values of the ratio $K$ which respectively determine two laterally offset guide paths along which the vehicle is to be guided. These two values of $K$ will normally differ by the appropriate amount to move the vehicle across by the width of the agricultural implement which the vehicle is operating.

Investigations have shown that, for guide members which are in substantially the same horizontal plane as the sensing means on the vehicle, control of the vehicle along a predetermined path is possible for positions close to the guide member to positions which are widely spaced from the guide member, for example up to 50 to 100 feet. However, if the guide members are buried about 2 or 3 feet below the surface on which the vehicle is operating, good control of the vehicle along a predetermined path is obtainable when the predetermined path is more than about 20 feet from the nearest guide member. At distances less than 20 feet from the nearest guide member the determination of gradient based on the determination of the vertical components of the electromagnetic field becomes responsive to changes in depth of the wire; that is to say, in the event of the vehicle either sinking into the surface of the ground, or if there is any change in the level of the ground relative to the buried guide member, there is an apparent deviation of the vehicle from the desired path.

Therefore, for accurate control over the whole area using buried wires, it is preferred for there to be two sets of guide members which are operating to generate different electromagnetic fields. In these circumstances the vehicle is operated so as to follow at all times a predetermined path which is laterally offset by more than 20 feet from one of the buried guide members.

It has further been found that good accuracy in the control of a vehicle along a predetermined path laterally offset from a guide member is obtainable when adjacent guide members in any set are separated by a distance equal to about 25 times the lateral spacing on the vehicle of the individual detectors of the vertical components of the electromagnetic field. In most cases the individual detectors will be laterally spaced about 4 feet apart so that a guide member spacing of the order of 100 feet is advantageous. Consequently, even when two sets of buried guide members are employed and different signal frequencies are applied to each set, spacings of at least 50 feet are possible between the two nearest guide members. This is a much greater spacing of guide member than has been achieved in any vehicle guidance system employed hitherto.

If the spacing of the detectors on the vehicle can be increased, or if a relaxation in accuracy beyond about one-tenth of a foot in the variation of the vehicle from the desired guide path is permissible, then greater wire spacings may be employed.

When more than one pair of guide members is energized simultaneously some distortion in the detected signal is experienced, but a simple correction may be applied because the distortion is effectively independent of the position of the detectors in relation to the guide members.

The measure of the difference in the vertical components of the electromagnetic field at spaced points on the vehicle utilized with a comparison with the actual vertical field strength at the vehicle is the preferred method of operating in accordance with the present invention, because it enables a desired accuracy in the path of the vehicle to be obtained with less accuracy in the actual measurements made than does, for example, the use of a straight ratio of the vertical components of the electromagnetic field.

Further in accordance with the present invention there is provided a vehicle, adapted for guidance along a plurality of paths offset laterally by different distances from the path of a guide member which emits an electromagnetic guide signal, comprising a sensing head including a pair of detectors having similar relative responses to an electromagnetic guide signal and connected in circuit so as to provide a first signal output dependent upon the difference in strength of a selected component of the electromagnetic guide signal at their respective locations, means arranged to provide a second signal output dependent upon the strength of the selected component of the electromagnetic guide signal in the vicinity of the pair of detectors, a comparator for comparing signals dependent respectively on the first and second signal outputs and giving an error signal when there is a difference between the signals compared by the comparator, and adjustable circuit means for applying to the comparator a selected proportion only of at least one of the first and second signal outputs whereby the position of the vehicle in relation to the guide member at which no error signal is given can be varied at will and any desired laterally offset path can be chosen.

As already indicated the component of the electromagnetic guide signal which is detected is advantageously the vertical component, and preferably the detectors used in the sensing head are coils having their magnetic axes vertical.

In one of the embodiments in accordance with the present invention which will be described, the means providing the second signal output is a third coil located in the vicinity of the first two coils with its magnetic axis vertical and arranged to produce the said second signal output.

In another embodiment of the present invention which will be described, the means providing the second signal output comprises means for extracting from one or both of the coils of the pair a signal dependent upon the strength of the signal received in one or both of the coils of the pair.

The adjustable circuit means for applying to the comparator a selected proportion only of one or both of the first and second signal outputs may be a variable attenuator connected in the path of either the first or second signal outputs, or there may be variable attenuators connected respectively in the paths of the first and second signal outputs to the comparator device. These attenuators may be, for example, resistive or inductive potentiometers, or, alternatively, the selected proportions may be obtained by using amplifiers of different relative gain for each of the first and second signal outputs.

Also the adjustable circuit means for selecting a proportion of one or both of the signal outputs may form a part of the comparator itself. Such an arrangement is one in which a differential amplifier having different gains on the two inputs is used. Alternatively the first and second signal outputs could be applied to a transformer having adjustable tappings from which there is extracted a null signal when the vehicle is in a desired relation to the guide wire. One embodiment of the invention which will be described and in which the adjustable circuit means is a part of the comparator is an embodiment employing an autotransformer.

The present invention will be better understood from the following detailed description of preferred embodiments thereof, which is made, by way of example, with reference to the accompanying drawings, in which:

FIG. 1 is one circuit diagram of a magnetic sensing head of a vehicle in accordance with the present invention;

FIG. 2 shows an alternative arrangement of part of the circuit of FIG. 1;

FIG. 3 shows an alternative circuit diagram of a magnetic sensing head for a vehicle in accordance with the present invention;

FIG. 4 shows a further circuit diagram of a magnetic sensing head for a vehicle in accordance with the present invention;

FIG. 8 shows one pattern for a guide wire for use in guiding a vehicle in accordance with the present invention;

FIG. 9 shows an alternative arrangement involving two patterns of guide wire for guiding a vehicle in accordance with the present invention, and FIG. 10 shows a modification of part of any one of the circuits of FIGS. 1, 3, 4, 5, 6 and 7 for controlling the traverse of the vehicle over the whole of an area occupied by guide wires as in FIG. 8 or FIG. 9.

In the drawings the same or similar parts are designated by like reference numerals.

Figure 5:
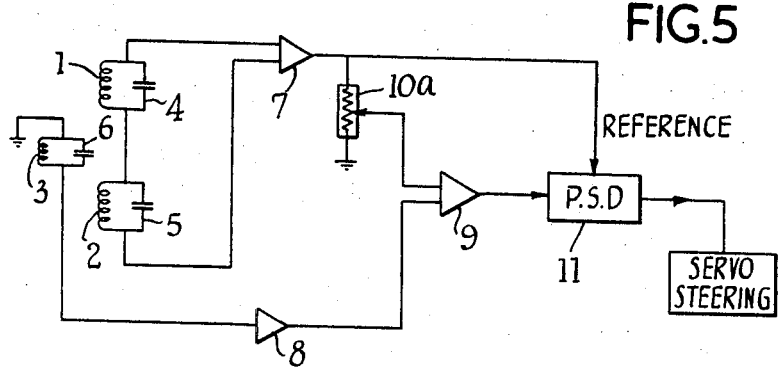
FIG. 5 is another circuit arrangement for a magnetic sensing head in accordance with the present invention.

Referring to FIG. 1, there is shown a magnetic sensing head arrangement including coils 1, 2 and 3 which are arranged with their magnetic axes substantially vertical and with the coils 1 and 2 spaced laterally on the vehicle by a distance preferably less than the width of the vehicle. Advantageously the coil 3 is positioned between the coils 1 and 2.

Each of the coils 1, 2 and 3 is connected in a tuned circuit denoted by the reference numerals 4, 5 and 6 respectively. The tuned circuits 4 and 5 are connected with their outputs in phase-opposition when the direction of the axial component of the magnetic field is the same in both coils 1 and 2, so that the signal which is applied to an amplifier 7 is a signal dependent upon the difference in strength of the components of the magnetic field along their respective axes. The output from tuned circuit 6 containing the coil 3 is connected to an amplifier 8 which, like amplifier 7, is preferably a low-noise amplifier of stable gain.

The output of amplifier 7 is a first signal output which is connected directly to one input of a differential amplifier 9, and the output of the amplifier 8 is connected through an adjustable attenuator 10 to the second input of the differential amplifier 9. The signal which is applied from the attenuator 10 to the differential amplifier 9 is a second signal output.

The output of the differential amplifier 9, which is a comparator device, is fed as a signal input to a phase sensitive detector 11, which may be a rectifier, and a second signal output taken directly from the amplifier 8 is fed as a reference input to the phase sensitive detector 11.

The coils 1 and 2 being similar coils, when these coils 1 and 2 are disposed different lateral distances from a guide wire, they will have different responses and a difference signal will be given as the output of the amplifier 7. By appropriate adjustment of the attenuator 10 such a proportion of the signal received in the coil 3 may be taken so as to exactly balance this difference signal for any selected offset path of the vehicle in relation to the guide wire.

When the vehicle is on a selected offset path there will be no signal input from the differential amplifier 9 to the phase sensitive detector 11, and any departure from the selected offset path will produce a signal input to the phase sensitive detector 11 and hence an output signal from that phase sensitive detector which is an unambiguous representation of the direction and extent of the deviation from the selected offset path. The output signal from the phase sensitive detector 11 is therefore used to control a servo steering mechanism to keep the vehicle on the desired offset path.

Therefore the arrangement in accordance with FIG. 1 provides a magnetic sensing head which is capable of controlling a vehicle along any one of a number of paths offset difference distances from a guide wire, the selection of the offset path being made by a simple adjustment of the attenuator 10.

Preferably the coils 1 and 2 are arranged in a single tuned circuit 12, as shown in FIG. 2, and this arrangement has the advantage that variations in the characteristics of the coils influence variations in the difference signal, which is the first signal output, to a lesser extent than when separate tuned circuits 4 and 5 are employed.

FIG. 3 shows a circuit arrangement essentially similar to FIG. 1, but having the differential amplifier 9 replaced by a transformer 13. In the circuit of FIG. 3 a further amplifier 14 is preferably included between the transformer 13 which compares the first and second signal outputs and the phase sensitive detector 11.

FIG. 4 shows an arrangement in which the attenuator 10 and the differential amplifier 9 are replaced by an autotransformer 15. The $H$ signal detected by tuned circuit 6 and the $H$diff signal resulting from the two tuned circuits 4 and 5 are amplified and the resulting $Vh$ and $V$diff signals are connected in antiphase to the ends of the autotransformer 15. The transformer output, $Ve$, is given by $$Ve = d \cdot Vh - (1-d) \, V\text{diff}$$

where $d$ is the ratio of the autotransformer.

When $Ve = 0$, $V\text{diff}/Vh = K = d/(1-d)$

The value of $K$ is thus set by the ratio of the autotransformer, which is a very accurate device. No difference amplifier is required, and this is a great advantage.

FIG. 5 shows an arrangement in which an attenuator 10a is included in the path of the first signal output to the differential amplifier 9 and the attenuator 10 of FiG. 1 is omitted. The circuit of FIG. 4 is otherwise essentially the same as that of FIG. 1.

The most flexible arrangement for selection of offset paths in relation to a guide wire is one in which two attenuators are provided, respectively one in each of the first and second signal output paths to the phase sensitive detector. In this arrangement therefore both attenuators 10 and 10a would be included. A similar effect is obtained, however, by using an autotransformer 15 as in FIG. 4.

Figure 6:
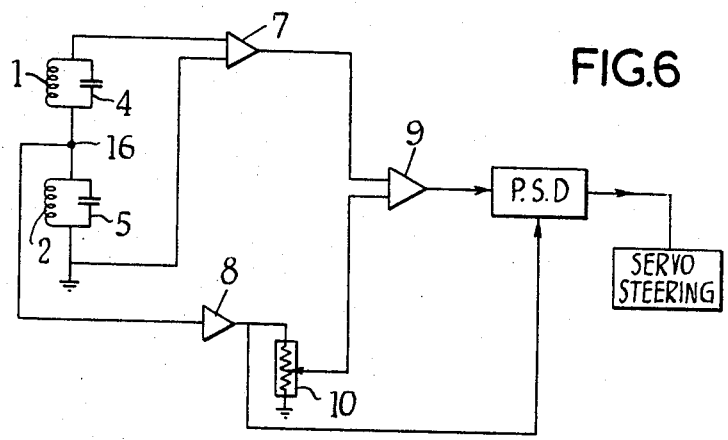
FIGS. 6 and 7 show alternative means for deriving the second signal output.
Figure 7:
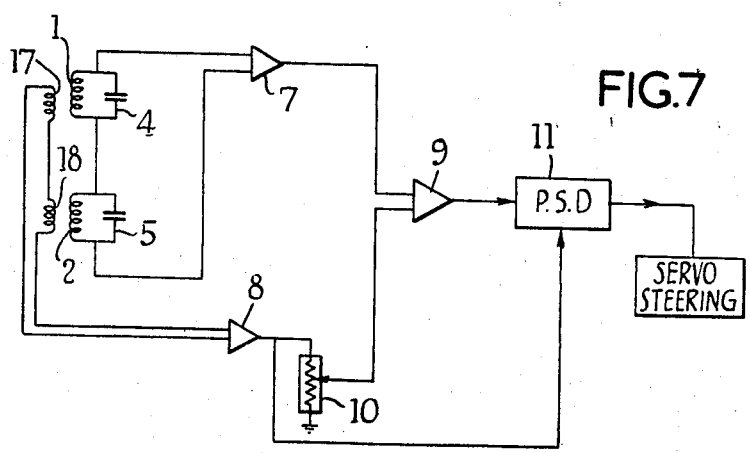

Instead of using a separate coil 3 to provide the second signal output, this may be obtained from one or both of the coils 1 and 2. When such a method is employed, however, it is essential that the coils 1 and 2 have separated tuned circuits 4 and 5. FIG. 6 shows an embodiment in which the second signal output is derived from the coil 2 by straight tapping off at point 16, and FIG. 7 shows another arrangement in which the second signal output is derived inductively from both coils 1 and 2 by using additional coils 17 and 18.

In the practice of the present invention, the effective determination of the gradient of the magnetic field at the sensing head by measuring in difference signal from the coils 1 and 2, followed by a comparison of this difference signal with the level of the magnetic field strength in the vicinity of the coils 1 and 2 enables an unambiguous determination of the position of the sensing head in the magnetic field to be made.

A guide wire, from which a vehicle is to be controlled by a method in accordance with the present invention, is preferably laid in a pattern which includes a series of substantially rectangular loops of wire. One such pattern is illustrated in FIG. 8. The guide wire, which is generally denoted by the reference numeral 20, effectively forms two loops 21 and 22, the sides of each of which are constituted by respective opposed lengths 23, 24 and 25, 26 of guide wire. The lengths 24 and 26 of guide wire are effectively the return wires which are paired with the lengths 23 and 25 in each of the loops 21 and 22. Suitable dimensions for this pattern of guide wire are, for example, 500 to 600 feet for the lengths 23, 24, 25, 26 of guide wire and spacings of about 100 to 150 feet between the adjacent lengths 23, 24, 25 and 26.

Between the loops 21 and 22 there is an area 27 of similar size to the area enclosed by each loop. In the area 27 the lines of constant $K$ along which a vehicle will be guided in accordance with the present invention are a series of parallel straight lines each of which extends the same distance as the lengths 24 and 25 of guide wire. Within the loops 21 and 22, however, although the lines of constant $K$ are straight lines for the majority of the length of the loop, that is to say the majority of the distance over which the lengths 23, 24, 25 and 26 of guide wire extend, these lines of constant $K$ within the loop do tend to curve off towards the corner of the loop when they get within 30 feet or so of the end of the area enclosed by the loop. However, by adjustment of the selected value of $K$ a vehicle may be guided along a series of paths substantially parallel to the lengths 23, 24 of guide wire for the majority of those lengths. Consequently the majority of the area within the loop 21 may be traversed in a series of parallel paths by a selection of a series of suitable values for $K$.

The whole of the traverse within the loop may be controlled so as to turn the vehicle from a traverse along one line of constant $K$ to another line of constant $K$ by a method substantially as described in the cognate complete specification of my co-pending patent application Ser. No. 145,006.

However, the necessity for combining the magnetic sensing head arrangement herein described with the magnetic sensing head arrangement of our said co-pending patent application may be avoided by causing the vehicle always to traverse an area such as the area 27 which is between loops of guide wire. This may be achieved by using two separate guide wires laid in overlapping relation in a manner such as that shown in FIG. 9, where a first guide wire 30 is laid in three narrow loops in each of which there is a spacing of about 60 feet between the opposed sides 31 and 32, 33 and 34, and 35 and 36. The spacing between the adjacent sides 32, 33 and 34, 35 of different loops is of the order of 200 feet.

A second guide wire 40 similarly having three loops, and with similar spacing of the guide wires 41 and 42, 43 and 44, and 45 and 46 which constitute the three loops, is laid so that the loops in the second guide wire are exactly midway between the loops in the first guide wire.

The electromagnetic signal emitted by the guide wire 40 is of a different frequency from the electromagnetic signal emitted by the guide wire 30.

A vehicle may be caused to traverse the whole area in which the two guide wires 30 and 40 are laid, preferably at a depth of 2 to 3 feet beneath the surface, by traversing lines of constant $K$ between the adjacent loops in one or other of the guide wires.

Referring again to FIG. 9, the vehicle is caused to traverse the area having a width of 130 feet denoted by the line 50 under control of the guide wire 30 and is then caused to traverse the adjacent area having a width also of 130 feet denoted by the line 51 under the control of the guide wire 40. Alternative tuning capacitors are provided in the respective tuned circuits of the detector coils 1, 2 and 3 so that the sensing head may be switched from receiving one guide signal to receiving the other guide signal under control of an appropriate program.

In both cases an accurate traverse for the whole distance corresponding to the lengths 32, 33, etc. and 42, 43, etc. of guide wire is obtained. The vehicle may be steered at the end of each traverse of a line of constant $K$ under the control of a computer program initiated, for example, by a signal received from a trip wire, so that the vehicle is guided by the program to turn round and pick up the next line of constant $K$, the value of this $K$ differing from its previous value by an amount corresponding to the width of the implement controlled by the vehicle. The control of the vehicle is then returned to the sensing head of the present invention so that the vehicle is guided along this next line of constant $K$.

When the vehicle is under the control of the guide wire 30 and is traversing an area having a width such as that denoted by the line 50, the phase of the $H$diff signal reverses when the vehicle changes from following a line of constant $K$ on one side of a line 53 midway between the lengths 32 and 33 of the guide wire to following a line of constant $K$ on the other side of the line 53. At the same time the signal necessary for correcting the vehicle to return from a deviation to a course along a line of constant $K$ changes its sign. The additional inclusion of an inversion amplifier in the circuit of the magnetic sensing head arrangement with a means for switching this inversion amplifier into the circuit for vehicle working on one side of the line 53, but switching it out of the circuit when the vehicle is working on the other side of the line 53, enables both the reversal in the $H$diff signal and the change in the proper correction or steering signal to be accommodated.

The inversion amplifier is incorporated immediately after the amplifier 8 in the circuits of FIGS. 1, 3, 4, 5, 6 and 7 as shown at 55 in FIG. 10 with a contact 56 to control its inclusion in the circuit.

As stated above, the guide wires 30 and 40 of FIG. 9 are preferably buried and the whole area is traversed by the vehicle moving along lines of constant $K$ which are relatively remote from the controlling lengths of guide wire at positions where the magnetic field is substantially vertical. In this way control of a vehicle close to a buried guide wire, i.e. within 10 feet or so, where the control would be responsive to changes of depth, is avoided. However, the lengths 23, 24, 25 and 26 of the guide wire 20 of FIG. 8 are preferably mounted on posts at a height of approximately 12 to 18 inches above ground, so that the guide wire is effectively in the same horizontal plane as the magnetic sensing head on the vehicle. In these circumstances the vehicle may be guided accurately along lines of constant $K$ close up to the lengths 23, 24, 25 and 26 of the guide wire and small areas, on which these lengths of guide wire are situated, are left untraversed. The guide wire 20 is buried at the end sections between the adjacent lengths 23, 24, etc. in order to permit free movement of the vehicle.

In the area 27 between the loops 21 and 22 the vehicle is guided along lines of constant $K$ and caused to turn at the end of each run under the control of a program as described with reference to FIG. 9. Within the loops 21 and 22, however, the vehicle may be controlled along lines of constant $K$, followed by turning along lines of constant $H$ by the method described in my aforementioned co-pending patent application Ser. No. 145,006.

In addition to being incorporated on a vehicle jointly with a device for sensing deviations of the vehicle from lines of constant magnetic field strength, as described and claimed in the said co-pending applications Ser. No. 145,006, the sensing head may be incorporated jointly with a sensing head for guiding the vehicle either midway between two wires which are outgoing and return lines in the same circuit or directly above one guide wire. A sensing head having this alternative facility is described and claimed in my co-pending application Ser. No. 865,932.

Indeed the magnetic sensing head described in the present specification may be incorporated on a vehicle jointly with sensing heads in accordance with all my co-pending application Ser. Nos. 865,932 and 145,006. A vehicle may then be guided by an appropriate program built into it, so that it proceeds automatically from its garage up a farm lane to a chosen field which it then traverses using essentially the lines of constant gradient of magnetic field (constant $K$), with the option of also using the lines of constant magnetic field strength (constant $H$) near and at the ends of the individual traverses.

Accuracy of the order of less than 3 inches in the determination of the guide path of the vehicle has been obtained employing an embodiment of the invention as herein described without the use of expensive or complicated instruments. Furthermore, the spacing between the guide members is substantially greater than the 20 feet which was previously proposed, so that there is a very considerable decrease in the amount of guide wire which is used as compared with the previously proposed systems.

What I claim is:

1. A guidance system for controlling steering means of a vehicle to selectively guide the vehicle along any one of a plurality of paths at different distances laterally offset from a predetermined plane in which a guide member is located, the guide member being operative to emit an electromagnetic field, said system being adapted for mounting on the vehicle and comprising: a pair of detectors in laterally spaced relation on the vehicle and producing similar relative responses corresponding to the strength of a selected component of said electromagnetic field, said strengths varying with the distance from said predetermined plane, the ratio of said relative responses being substantially constant and independent of the emitted field strength when the vehicle is in any one of said plurality of paths, and said ratio of said relative responses having different values respectively corresponding to said paths, circuit means connected to said pair of detectors and including signal comparison means and ratio adjustment means for selecting any one of said plurality of laterally offset paths to be followed, said comparison means being operative to produce an error signal when the ratio of said strengths of said selected components deviate from a value determined by said adjustment means, and steering control means responsive to said error signal for controlling the steering means to steer the vehicle toward the path selected by adjustment of said adjustment means, whereby the vehicle may be selectively guided in any one of said plurality of paths by adjustment of said adjustment means.

2. In a guidance system as defined in claim 1, said circuit means including means connecting said detectors in circuit to produce a first signal output dependent upon the relative difference between said similar relative responses produced by said detectors, and means producing a second signal output corresponding to the signal strength at a distance from said predetermined plane in the vicinity of said pair of detectors, said ratio adjustment means being operative to modify said second signal output, and said signal comparison means being responsive to said first and said modified second signal outputs.

3. In a system as defined in claim 1, said ratio adjustment means comprising a variable attenuator.

4. In a system as defined in claim 1, said ratio adjustment means comprising a variable autotransformer.

5. In a system as defined in claim 1, said detectors being oriented to respond to components of the electromagnetic field in directions generally parallel to said predetermined plane.

6. In a system as defined in claim 5, wherein the vehicle is movable in a horizontal direction on a generally horizontal surface with the guide member being horizontal and in proximity to said surface, said predetermined plane being vertical and said detectors comprising coils having generally vertical axes.

* * * * *